United States Patent [19]

Kume et al.

[11] Patent Number: 4,536,875
[45] Date of Patent: Aug. 20, 1985

[54] RETRANSMISSION CONTROL SYSTEM

[75] Inventors: Hiroshi Kume; Yoichi Tan, both of Kanagawa, Japan

[73] Assignee: Fuji Xerox Co., Ltd., Tokyo, Japan

[21] Appl. No.: 509,006

[22] Filed: Jun. 29, 1983

[30] Foreign Application Priority Data

Jun. 29, 1982 [JP] Japan ................................ 57-110592

[51] Int. Cl.$^3$ ........................... H04J 3/02; H04J 6/00
[52] U.S. Cl. ...................................... 370/85; 370/94; 340/825.5
[58] Field of Search ........................... 370/60, 94, 85; 340/825.5

[56] References Cited

U.S. PATENT DOCUMENTS

| | | | |
|---|---|---|---|
| 4,234,952 | 11/1980 | Gable et al. ........................... | 370/85 |
| 4,387,466 | 6/1983 | Sire ...................................... | 370/94 |
| 4,443,875 | 4/1984 | Blausten ................................ | 370/94 |
| 4,445,214 | 4/1984 | Reynolds et al. ..................... | 370/85 |
| 4,453,247 | 6/1984 | Suzuki et al. ......................... | 370/60 |
| 4,464,749 | 8/1984 | Ulug ...................................... | 370/94 |
| 4,491,942 | 1/1985 | Witte et al. ........................... | 370/94 |

Primary Examiner—Douglas W. Olms
Assistant Examiner—Curtis Kuntz
Attorney, Agent, or Firm—Sughrue, Mion, Zinn, Macpeak & Seas

[57] ABSTRACT

In a pocket switching communications system of the type in which each station sends its packet into an unoccupied block within a frame, the retransmission interval is determined by generating a random number, weighting the random number in accordance with the number of collisions which the station has encountered since it first requested transmission and/or the degree of congestion monitored in the frame in which the most recent collision occurred. The retransmission interval is then determined in accordance with the weighted number.

18 Claims, 7 Drawing Figures

RETRANSMISSION CONTROL SYSTEM

BACKGROUND OF THE INVENTION

This invention relates to a digital signal transmission system in which communications are carried out in a packet mode by using a communication cable such as a coaxial cable, and more particularly to a system for controlling the retransmission of data when data applied to the communication cable from different stations collide with each other.

As electronic computers have been popularized and digital signal processing techniques have been developed, a significant development has been the combination of the communications system with the data processing system, to process the data on line. Especially in the case of a small scale communications system such as that employed in government and public offices and in private companies, packet switching communications systems using a communication cable such as a coaxial cable are being watched with keen interest, since they are economical, and high in both reliability and transmission efficiency.

In such a packet mode communications system, a communication cable for two-way transmission is installed, for instance, in a laboratory, and a number of stations (personal stations) are connected to the cable. The stations transmit a message which is divided into data blocks each having a 1000 to 2000 bits. A header including a destination code, a communication number, etc. is added to the message. The network itself is a passive transmission medium which has no control function, and the control is distributed to the stations. Accordingly, each station accesses a channel to start transmission of a message, after confirming that the transmission path is empty. When the packet signal from one station collides with that of another station during transmission, the two stations stop transmitting the signals. Each station which has stopped its transmission tries to transmit the message again after waiting a predetermined period of time.

On the other hand, in such communications systems the stations freely start transmitting data, and therefore the collision of packet signals may occur more than once on the same transmission path. Accordingly, the communications system suffers from the problem that the transmission delay time is not constant. Thus, the communications system is unsuitable for real time transmission in which, such as in a conversational voice communication, the signal transmission and reception relationship on the real time axis is essential. Of course, this problem can be solved by providing a permanent master station to require the stations to make appointments for channel access. However, if the master station becomes out of order, then it will be impossible to carry out the data communication, and the system is therefore unreliable.

In order to overcome the above-described difficulty, a digital signal transmission system called "Modified Ethernet" has been proposed in the art. In this system, the time axis is divided into periodic frames each of which in turn is divided into a plurality of small parts (blocks) and the stations (personal stations) are allowed opportunities for packet communication within the blocks. Accordingly, the stations are equal in their utilization of empty blocks. In addition, a station which occupies a block for a period of time required for signal transmission will have an opportunity to retain that block for transmission during the next frame.

Figure 1:
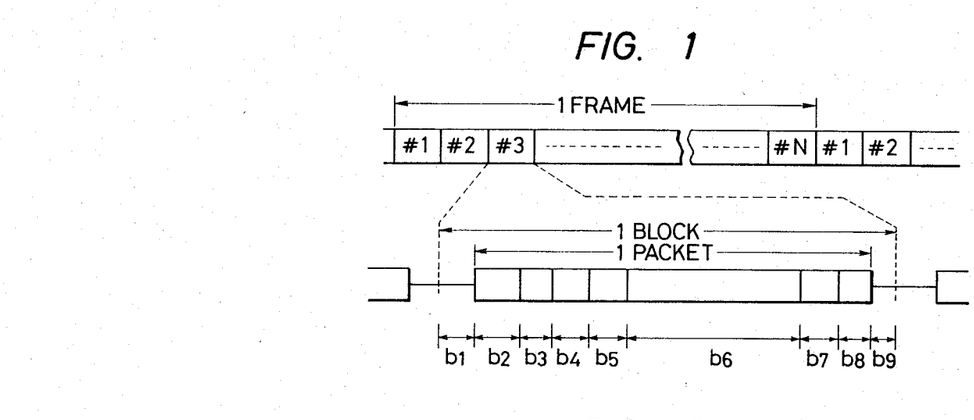
FIG. 1 is an explanatory diagram showing the arrangement of frames in a conventional modified ethernet communications system.

FIG. 1 shows the arrangement of frames in a signal in the modified ethernet system. The frame which occurs periodically on the time axis has N blocks #1 through #N. Each block has the following bit trains $b_1$ through $b_9$:

$b_1$: rear guard time
$b_2$: preamble
$b_3$: address bit
$b_4$: distance code bit
$b_5$: control bit
$b_6$: data bit
$b_7$: check bit
$b_8$: end flag
$b_9$: front guard time The bit trains $b_2$ to $b_5$ and $b_6$ to $b_8$ are required for forming a packet, and are called overhead (additional) bits. The two other bit trains $b_1$ and $b_9$ are both called guard times. The guard time is an empty bit train for preventing adjacent packets from being partially overlapped with each other because of the delay time which occurs when the packet of each block propagates on the coaxial cable. The rear guard time $b_1$ is provided for protecting the rear packet and the front guard time $b_9$ is provided for protecting the front packet. Hereinafter, the total guard time ($b_1 + b_9$) will be represented by $\tau g$, where g is the sum of the number of bits of the rear guard time $b_1$ and the number of bits of the front guard time $b_9$.

Figure 2:
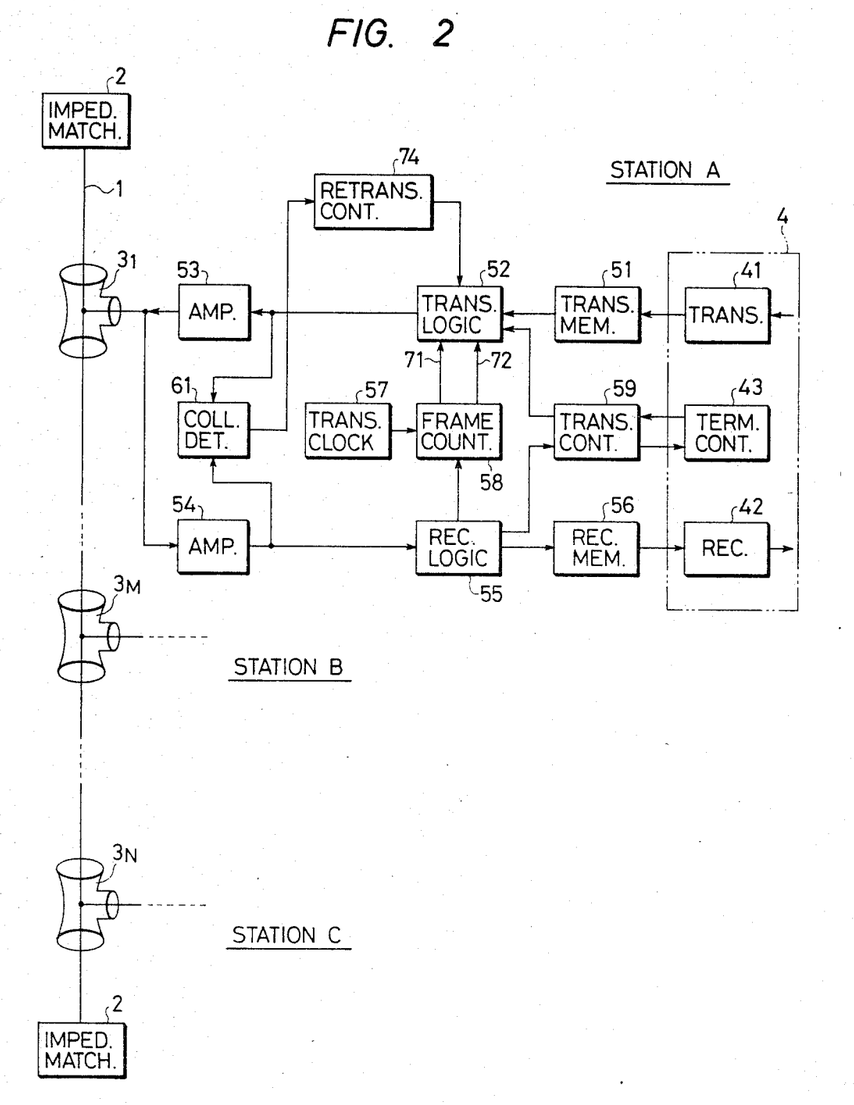
FIG. 2 is a block diagram outlining the arrangement of a communications system which employs a conventional retransmission control system.

FIG. 2 is an illustration of the above-described modified ethernet system. In such a communications system, a transmission path, i.e. a coaxial cable 1, is connected between impedance matching terminators 2 each having a resistance equal to the characteristic impedance of the cable. Stations are connected to the coaxial cable 1 through T-connectors (or taps) 31 through 3N. These stations are fundamentally the same in arrangement, and only the essential parts of the station A are illustrated in FIG. 2.

Each station has a subscriber device 4 provided with a computer, a telephone, etc. The device 4 comprises a transmitter (encoder) 41 for transmitting digital signals in packets to another station, a receiver (decoder) 42 for receiving digital signals in packets from another station, and a terminal controller 43 for controlling the terminal. The output signal of the transmitter 41 is temporarily stored in a signal transmitting buffer memory 51. The signals thus stored are collectively read at a predetermined time with a clock signal having a period equal to the speed of transmission on the coaxial cable transmission medium. The signals thus read are converted into a predetermined packet by a signal transmitting logic circuit 52. The packet is applied through a signal transmitting buffer amplifier 53 and the T-connector $3_1$ to the coaxial cable 1.

On the other hand, all the packet signals transmitted through the coaxial cable 1 are applied through the T-connector 31 to a signal receiving buffer amplifier 54. A signal receiving logic circuit 55 selects one out of the packet signals thus received which is destined for its own station (the station A), and the packet signal thus selected is temporarily stored in a signal receiving buffer memory 56. The signals thus stored are read continuously with a predetermined clock signal, to provide an output signal.

The signals are transmitted and received as described above. The transmission clock signal used in the operation is produced by a transmission clock pulse generator 57. A frame counter 58 frequencydivides the transmission clock signal to provide a frame timing signal 71 for specifying frame timing and a block timing signal 72 for specifying block timing. A transmission control circuit 59 receives through the logic circuit 55 the received signal which is destined for its own station (the station A), so as to control the terminal controller 43 and to control the signal transmission logic circuit 52 according to instruction signals from the terminal controller 43. A collision detecting circuit 61 operates to detect whether or not, when a packet signal is transmitted with a block selected by its own station, the packet signal collides with the packet signal of another station. When a collision is detected, a retransmission control circuit 74 determines a retransmission interval and controls the signal transmitting circuit 52 for retransmission of the packet signal.

The collision of packet signals in the communications system will now be described in more detail.

In all of the stations, the subscriber devices 4 have memories (not shown) for indicating occupation of the blocks #1 through #N in a frame. In each of the stations, the packet signals are received by the buffer amplifiers 54, and the blocks being used are registered according to the packet signals thus received. In the modified ethernet system, for real time transmission, a station which has occupied a block in one frame can retain the same block in the next frame. Accordingly, a station which has issued a signal transmission request selects an empty block indicated by the memory and transmits a packet signal in the same block in the next frame. However, if plural stations request signal transmission substantially at the same time, they may select the same empty block and may start transmitting their packet signals simultaneously. In this case, a collision of the packet signals occurs, and therefore the stations may try to transmit the messages again after optional periods of time.

This type of retransmission control is not specified by the modified ethernet system, but instead a BEB (binary exponential back-off) protocol is usually employed, as will now be described. It is assumed that, in FIG. 3, when a packet signal is transmitted within first block #1 in a frame, the station A provides a first transmission request SR-A1, and when a packet signal is transmitted in the third block #3 in the same block, the station B produces a first transmission request SR-B1. If the first through fourth blocks #1 through #4 in the block are being used, the stations A and B select the fifth block #5 for transmitting their packet signals, as a result of which the signals collide with each other in the fifth block #5.

In the BEB protocol system, each station which has suffered from the collision of packet signals is caused to select an empty block in a predetermined retransmission interval $t_1$, to transmit the packet signal again. The retransmission interval $t_1$ is:

$$t_1 = \tau \cdot n \quad (1)$$

In expression (1), $\tau$ is the time duration for the retransmission interval and is called "a slot time", the slot time $\tau$ being one block length, and n is an integer defined by the following expression (2):

$$0 \leq n < 2^l \quad (2)$$

The integer n is provided by a random number generator. In expression (2), l is a value representing the number of collisions which have occurred. The value of l is stored by a counter or memory in a station which transmits a signal. The value is increased whenever a collision occurs, and is cleared to zero when the transmission has been achieved. Thus, in the retransmission control system according to the BEB protocol, as the number of encountered collisions increases, the retransmission interval is increased.

Figure 3:
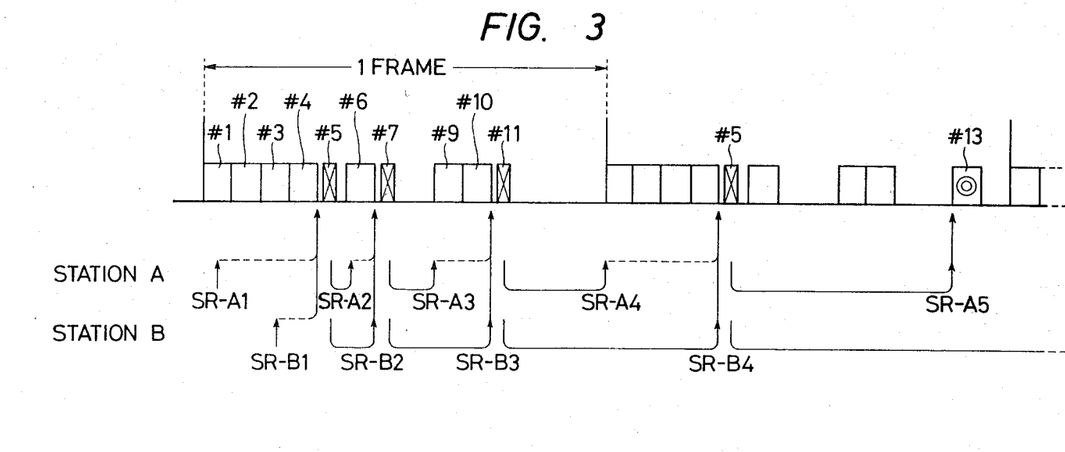
FIG. 3 is a time chart for a description of the BEB retransmission control used in the modified ethernet system.

In the case of FIG. 3, the first collision occurs in the fifth block #5, and therefore the integer n is 0 or 1. It is assumed that the station A produces a second transmission request SR-A2 at the sixth block #6 which is one block after the fifth block ($t_1=0$) and the station B produces its second transmission request SR-B2 at the seventh block #7 which is two blocks after the fifth block ($t1=\tau$). If, in this case, the sixth block #6 is being used and the seventh block #7 is empty, then a collision occurs again. If, after the collision, the station A produces a third transmission request SR-A3 after two blocks and the station B produces its third transmission request after four blocks, then a third collision occurs at the eleventh block #11 when the ninth and tenth blocks #9 and #10 are being used. The collision of packet signals is repeatedly carried out as described above. In the case of FIG. 3, on the fifth transmission request, the station A can achieve the transmission of its packet signal at the thirteenth block #13 in the second frame.

As is clear from the above description, in the conventional BEB protocol retransmission control system, only the number of times a collision has occurred is utilized as the operating reference data, i.e. as the number of encountered collisions increases, the retransmission interval is gradually increased. Accordingly, in the case where a plurality of stations produces transmission requests one after another while the channels are busy, these stations are liable to repeatedly retransmit the packet signal at short time intervals. Thus, even if empty blocks are found, the collision of packet signals occurs successively in these blocks. Accordingly, it is difficult to achieve the calling operation, and the channel utilization percentage is low.

SUMMARY OF THE INVENTION

In view of the foregoing, an object of this invention is to provide a retransmission control system in which the number of packet signal collisions is reduced and the channel utilization percentage is increased.

The foregoing object of the invention has been achieved by the provision of a retransmission control system in which the retransmission intervals are weighted according to the kinds of data transmitted in the packets and/or according to the degree of channel congestion which has occurred, to thereby reduce as much as possible the number of times that a plurality of stations will attempt to occupy one and the same empty block.

BRIEF DESCRIPTION OF THE DRAWINGS

The preferred embodiments of this invention will be described with reference to the accompanying drawings, in which.

DETAILED DESCRIPTION OF THE PREFERRED EMBODIMENT

Figure 4:
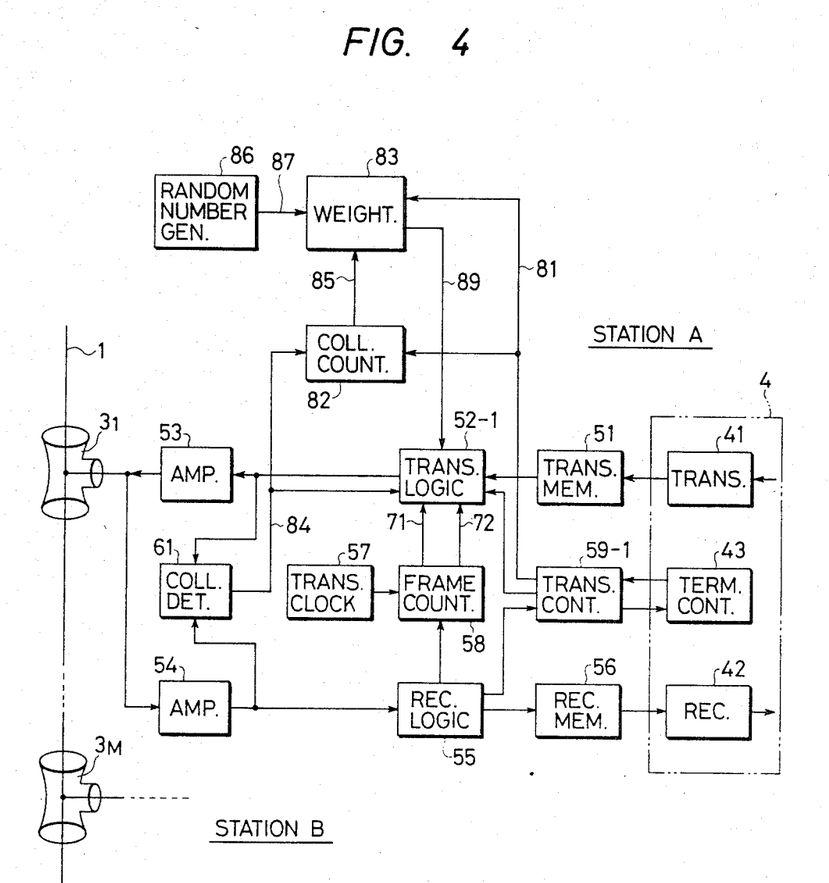
FIG. 4 is a block diagram outlining the arrangement of a communications system which employs a retransmission control system according to a first embodiment of this invention.

FIG. 4 is a diagram outlining the arrangement of a communications system employing a retransmission control system according to a first embodiment of the invention. All of the stations which are connected to a coaxial cable 1 are fundamentally the same in arrangement as one another, and therefore FIG. 4 shows only the station A which is connected through a T-connector $3_1$ to the cable 1. In FIG. 4, those components which have been previously described with reference to FIG. 2 are designated by the same reference numerals or characters, and the detailed descriptions thereof will be omitted.

Figure 5:
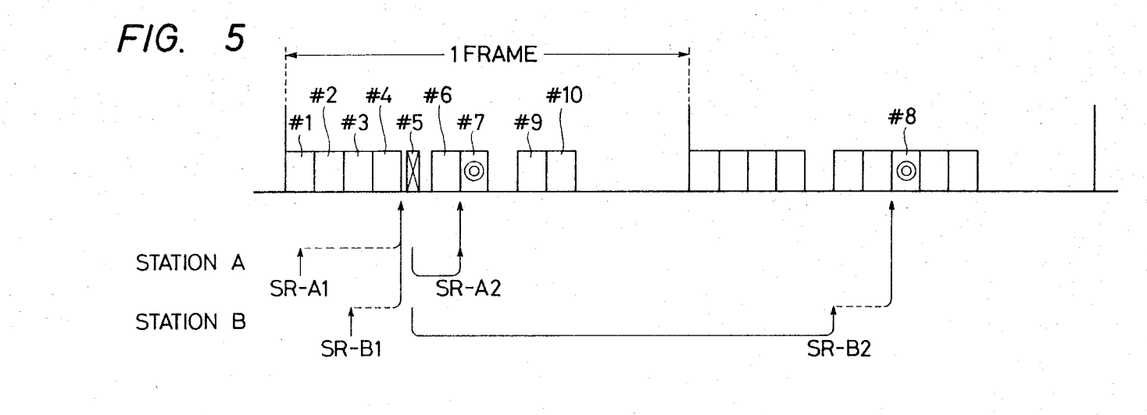
FIG. 5 is a time chart for a description of the retransmission control system according to the first embodiment of the invention.

It is assumed that the subscriber devices 4 of the stations A and B have made their retransmission requests one after another. The terminal controller 43 checks the occupation status of packets with the aid of a memory (not shown) in the subscriber device 4, to select the soonest occuring empty block. It is assumed that, as shown in FIG. 5, the first transmission request SR-A1 of the station A is made during the interval of the first block #1, and the first transmission request SR-B1 of the station B is made during the interval of the third block #3. In this case, these stations will both select the fifth block #5. When this occurs, the terminal controller 43 discriminates the kind of data to be transmitted and delivers these two data to a transmission control circuit 59-1.

The transmission control circuit 59-1 transmits the signal of the fifth block #5 thus selected to a signal transmitting logic circuit 52-1. The logic circuit 52-1 outputs a packet signal for the fifth block #5 according to the frame timing signal 71 and the block timing signal 72 which are supplied from the frame counter 58. The packet signal is supplied through the signal transmitting buffer amplifier 53 and the T-connector $3_1$ (or $3_M$) to the coaxial cable 1.

The data representing the kind of the transmission data which is supplied to the transmission control circuit 59-1 is classified into code data and other data (sound data and picture data) and is supplied, as a data kind indicating signal 81, to a collision counter 82 and a weighting circuit 83. When the signal 81 is produced, the content of the collision counter 82 is cleared. According to the content of the data kind indicating signal 81, the weighting circuit 83 determines a weight α, e.g. as described below, and registers it:

(i) In the case of the code data—α=1

(ii) In the case of the other data—α=the number of blocks forming one frame.

Of course, the packet signals sent to the fifth block #5 by the stations A and B collide with each other. Upon detection of the collision, the collision detecting circuit 61 applies a detection signal 84 to the logic circuit 52-1 and to the collision counter 82, so that the transmission of the packet signal is stopped and the collision is counted. The collision counter 82 is incremented by a count of one (1) in this case. The weighting circuit 83 receives a count value signal 85 representing a count value, and also a receives a random number 87 outputted by the random number generator 86, to calculate a retransmission interval $t_2$ according to the following equation:

$$t_2 = \alpha \cdot \tau \cdot n \tag{3}$$

Thus, in this embodiment, the retransmission interval $t_2$ is equal to the retransmission interval $t_1$ in the above-described BEB protocol when the transmitted data is code data. When the transmitted data is sound data or picture data, the retransmission interval $t_2$ is equal to the product of the retransmission interval $t_1$ and the number of blocks forming one frame.

The retransmission interval $t_2$ is weighted as described above with the specific feature of the modified ethernet system taken into account. That is, in the modified ethernet system, when the first packet signal of data to be transmitted is sent to the coaxial cable to occupy a particular block without collision, all of the stations receive it, and occupied status of the particular block is registered in the occupation indicating memories. Accordingly, the station which has succeeded in transmission of its first packet signal can send the remainder of its packet in the same block in each succeeding frame until all of the packet is sent. Because of this specific feature, in this embodiment the period of time required for establishing the calling for the data which may require transmission of a packet for a long period of time is somewhat sacrificed, while for the data which may require transmission of a packet only for a short period of time the calling is established as early as possible. For instance in the case of the sound data or picture data, in general, real time transmission is carried out by using one block or a plurality of blocks in each frame. Therefore, with respect to such data, when a collision occurs during transmission of the first packet signal, the retransmission interval $t_2$ is set to longer than one frame, so that the code data has a chance for possessing an empty block. Employment of this method reduces the number of times of collisions and the rate of retransmitting a packet signal. Accordingly, the number of times that a transmission request must be made is also reduced, and it goes without saying that the lowering of the channel utilization percentage is prevented.

This will be more easily seen from an example of the operation of the above-described embodiment. The signal data 89 as to the retransmission interval $t_2$, counts the frame timing signal 71 and the block timing signal 72, and makes its transmission request in the retransmission interval $t_2$. It is assumed that the station A is going to transmit code data in a packet and that the station B is going to transmit sound data in a packet. In this case, in the station A, the weighting circuit 83 calculates the retransmission interval $t_2$ with α=1. It is assumed that, since the collision is the first one and the value 1 in expression (2) is 1, the random number generator 86 produces the integer "1". In this case, the retransmission interval $t_2$ for the station A is as follows:

$t_2$ (station A) $=\tau=$ one block length

It is assumed that in the station B also, the random number generator provides the integer "1". If fourteen (14) blocks form one frame in the embodiment, then the retransmission interval $t_2$ for the station B is as follows:

$t_2$ (station B) $= 14 \tau = $ 14-block length $=$ one frame length

Accordingly, the station A produces its second transmission request SR-A2 after one block, and the station B produces its second transmission request SR-B2 after one frame. If it is assumed that the seventh block #7 is empty, then the station A transmits the packet signal with the seventh block #7 of the frame in which the collision has occurred, thus achieving the calling, and the station B achieves the calling with the eight block #8 in the next frame. As is apparent from the above description, in this embodiment, even the station B in which the retransmission interval $t_2$ is long can achieve the calling earlier than the conventional station shown in FIG. 3.

Figure 6:
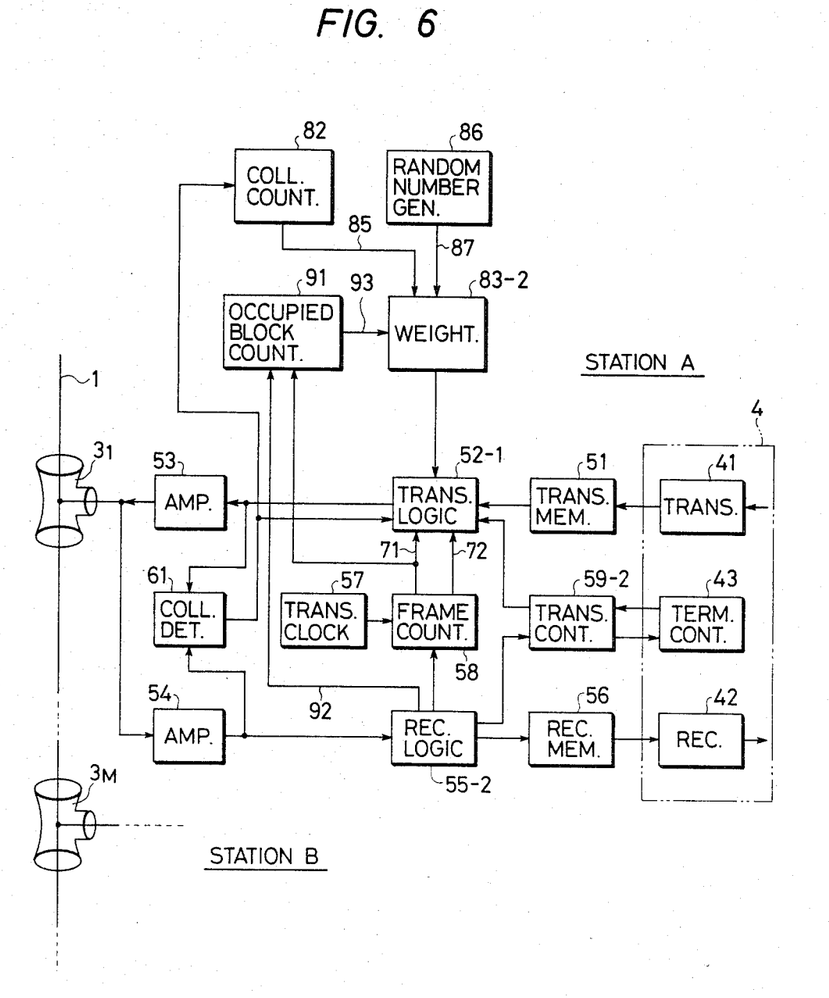
FIG. 6 is block diagram outlining the arrangement of a communications system which employs a retransmission control system according to a second embodiment of the invention.

FIG. 6 is a diagram outlining the arrangement of a communications system employing a retransmission control system according to a second embodiment of the invention. In this second embodiment also, all stations which are connected to a coaxial cable 1 are fundamentally the same in arrangement, and therefore only the essential parts of a station A which is connected through a T-connector $3_1$ to the coaxial cable 1 are illustrated in FIG. 6. In FIG. 6, those components which have been described with reference to FIG. 2 are therefore designated by the same reference numerals or characters, and their detailed descriptions will be omitted.

In this system, each station has an occupiedblock counter 91. The counter 91 receives the frame timing signal 71 from the frame counter 58, to cleaar the content of each frame after the frame has been started. Furthermore, the counter 91 receives the packet detection signal 92 of each block from a signal receiving logic circuit 55-2, to count the total number of blocks occupied, or used, in one frame. A number-of-blocks-used signal 93 represents this count value, and is supplied to a weighting circuit 83-2, so that the circuit 83-2 detects the degree of congestion for the channels in each frame.

The weighting circuit 83-2 receives from the collision counter 82 a count value signal 85 representing the number of packet collisions, and also receives a random number 87 from the random number generator 86. Therefore, the retransmission interval $t_1$ is first calculated according to expression (1) and then a weight is calculated according to the number-of-blocks-used signal 93. A retransmission interval $t_3$ in this embodiment is then calculated according to the following expression (4):

$$t_3 = \beta \cdot t_1 = \beta \cdot \tau \cdot n \quad (4)$$

where $\beta$ is the value which is obtained, for instance, from the following equation (5):

$$\beta = 1/(1-\eta) \quad (5)$$

where $\eta$ is the rate of blocks used which, where one frame is made up of fourteen blocks, is obtained by dividing the number of blocks used by fourteen.

It can be understood from equation (5) that the weight $\beta$ is increased as the rate of blocks used increases, becoming infinite with $\eta=1$ ($=100\%$), and that, where no blocks are used at all ($\eta=0$), the weight is one (1). Thus, in the case where many blocks are used, the retransmission interval is set long, to thereby reduce the number of times that a collision occurs.

Figure 7:
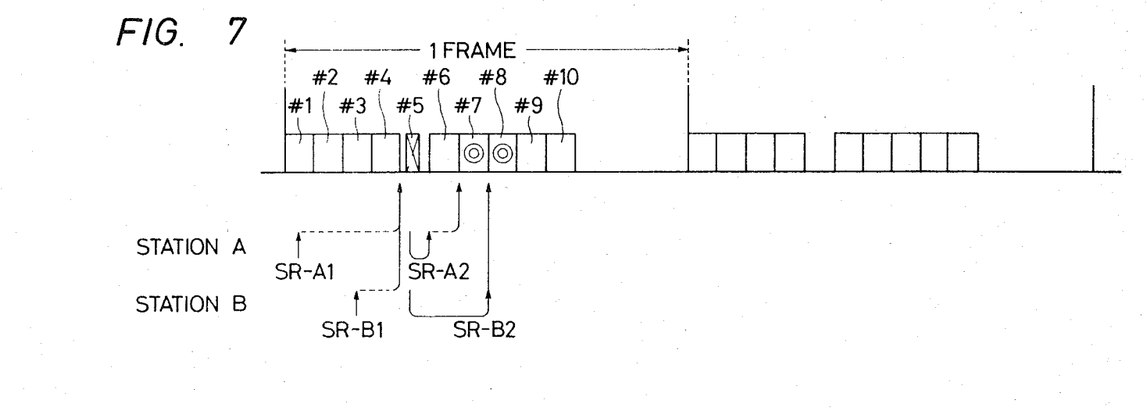
FIG. 7 is a time chart for a description of the retransmission control system according to the second emobodiment of the invention.

The operation of the retransmission control system according to the second embodiment will be described with reference to FIG. 7. It is assumed that the stations A and B have made their first transmission requests SR-A1 and SR-B1 with the same timing as that in FIG. 5, and a collision has occurred at the fifth block #5. If seven blocks #1, #2, #3, #4, #6, #9 and #10 were occupied in the frame which occurred immediately before the current frame, then $\beta=2$ from equation (5). It is assumed that, in response to the first collision, the random number generators 86 and 86 in the stations A and B generate the integers 0 and 1, respectively. In this case, the retransmission intervals $t_3$ of the two stations are as follows:

$t_3$ (Station A) $= 0\tau =$ 0-block length $t_3$ (Station B) $= 2\tau =$ 2-block length According to this, the station A issues its second transmission request SR-A2 after one block, and the station B makes the second transmission request SR-B2 after three blocks, as a result of which the station A achieves the calling with the seventh block #7 and the station B achieves the calling with the eighth block #8. Thus, in this embodiment, according to both the data on the number of collisions and the data on the channel congestion degree, the retransmission intervals are determined and the calling is achieved quickly.

In the above-described embodiments, the retransmission interval $t_1$ according to the BEB protocol is combined with the fundamental concept of the invention. However, depending on the system, the retransmission control system of the invention may be effected without taking the number of times of packet collisions into account. In other words, in general terms, the invention is a method in which the random number generator is caused to produce a positive integer m which is always smaller than a positive value M ($0<m<M$), and a weight $\alpha$ or $\beta$ is applied to the integer m in the weighting circuit. In this case, the retransmission intervals $t_4$ and $t_5$ are as indicated by the following expressions (6) and (7) which are obtained by modifying expressions (3) and (4), respectively:

$$t_4 = \alpha \cdot \tau \cdot m \quad (6)$$

$$t_5 = \beta \cdot \tau \cdot m \quad (7)$$

A retransmission interval $t_6$ with both the weights $\alpha$ and $\beta$ taken into account, and a retransmission interval $t_7$ obtained with the retransmission interval $t_1$ taken into account, are efective in the retransmission control system. These intervals $t_6$ and $t_7$ are as follows:

$$t_6 = \alpha \cdot \beta \cdot \tau \cdot m \quad (8)$$

$$t_7 = \alpha \cdot \beta \cdot \tau \cdot m \quad (9)$$

It goes without saying that a conventional retransmission control system other than that according to the BEB protocol may be combined with the fundamental technical concept of the invention.

In the above-described embodiment, the weight representing the degree of channel congestion is obtained from the count value (the number-of-blocks-used signal) outputted by the occupied-block counter; however, it may be calculated by the memory in the subscriber device, which is adapted to indicate block occupation states. The memory operates to register the use of blocks according to the packet signals of the stations which are received. If, when a collision occurs, the number of occupied blocks which has been registered in the memory is counted and the count signal is applied to the weighting circuit, then the channel congestion for one frame after the collision can be measured.

As is apparent from the above description, according to the invention, the retransmission intervals are controlled according to the kinds of packets and according to the channel congestion degree, and therefore the most suitable retransmission intervals can be set according to the given conditions. Accordingly, the number of times that packet collisions occur can be decreased, and the channel utilization percentage can be increased. In addition, a period of time which elapses from the time instant that the transmission request is made until the transmission is started, i.e. the transmission delay time, can be maintained at a minimum.

We claim:

1. A multi-station communications network of the type wherein a plurality of stations communicate with one another over a communication medium and wherein data signals on said medium are grouped into frames periodically occurring on a time axis, with each frame comprising a plurality of successively occurring blocks, each station including means for transmitting packet signals onto said medium to occupy a previously unoccupied block, whereby multiplexed digital signals are transmitted on said medium in a time division manner, said network including a retransmission control system for determining a retransmission time interval after which a particular station will retransmit its signals after a collision has occurred in one block between the signals of at least two different stations, the improvement characterized in that said retransmission control system determines said retransmission time interval of said particular station in accordance with at least one of a degree of congestion in the frame in which a collision has occurred and the type of data being transmitted in the packet signal of said particular station.

2. A multi-station communications network as claimed in claim 1, wherein said retransmission control system comprises:

first means for generating a slot time signal representing a predetermined time duration;

second means for generating a weighting signal in accordance with at least one of said degree of congestion in the frame in which a collision has occurred and the type of data being transmitted in the packet signal of said particular station; and multiplication means for multiplying said slot time signal by said weighting signal to obtain a weighted signal, said retransmission time interval being determined in accordance with said weighted signal.

3. A multi-station communications network as claimed in claim 2, wherein said retransmission control system comprises:

counting means for counting the number of occupied blocks in each frame in accordance with packet signals received from other stations, the number of occupied blocks in each frame representing said degree of congestion.

4. A multi-station communications network as claimed in claim 2, wherein said retransmission control system further comprises block status memory means for storing information representing the occupied or unoccupied status of each block in said periodically occurring frames, said degree of congestion corresponding to the number of occupied blocks in each frame and being determined in accordance with the contents of said block status memory.

5. A multi-station communications network as claimed in claim 2, wherein said second means further determines said weighting signal in accordance with binary exponential back-off (BEB) protocol.

6. A multi-station communications network as claimed in claim 2, wherein said second means includes a random number generator for generating random numbers in a predetermined range, said second means generating said weighting signal in accordance with said random number and said kind of data being transmitted.

7. A multi-station communications network as claimed in claim 3, wherein said second means includes a random number generator for generating random numbers, and said weighting signal is determined in accordance with a random number generated by said random number generator and in accordance with the number of occupied blocks in the frame in which the collision occurred.

8. A multi-station communications network as claimed in claim 4, wherein said second means includes a random number generator for generating random numbers, and said weighting signal is determined in accordance with a random number generated by said random number generator and in accordance with the number of occupied blocks in the frame in which the collision occurred.

9. In a multi-station communications network of the type wherein a plurality of stations communicate with one another over a communication medium and wherein data signals on said medium are grouped into frames periodically occurring on a time axis, with each frame comprising a plurality of successively occurring blocks, each station including means for transmitting packet signals onto said medium to occupy a previously unoccupied block, whereby multiplexed digital signals are transmitted on said medium in a time division manner, a retransmission control system for determining a retransmission time interval after which a particular station will retransmit its signals after a collision has occurred in one block between the signals of said particular station and the signals of at least one other station in said network, the improvement characterized in that said retransmission control system includes means for determining said retransmission time interval of said particular station in accordance with at least one of a degree of congestion in the frame in which a collision has occurred and the type of data being transmitted in the packet signal of said particular station.

10. A retransmission control system as claimed in claim 9, wherein said means for determining comprises:

first means for generating a slot time signal representing a predetermined time duration;

second means for generating a weighting signal in accordance with at least one of said degree of congestion in the frame in which a collision has occurred and the type of data being transmitted in the packet signal of said particular station; and multiplication means for multiplying said slot time signal by said weighting signal to obtain a weighted signal, said retransmission time interval being determined in accordance with said weighted signal.

11. A retransmission control system as claimed in claim 10, wherein said means for determining further comprises:

counting means for counting the number of occupied blocks in each frame in accordance with packet signals received from other stations, the number of occupied blocks in each frame representing said degree of congestion.

12. A retransmission control system as claimed in claim 10, wherein said means for determining further comprises block status memory means for storing information representing the occupied or unoccupied status of each block in said periodically occurring frames, said degree of congestion corresponding to the number of occupied blocks in each frame and being determined in accordance with the contents of said block status memory.

13. A retransmission control system as claimed in claim 10, wherein said second means further determines said weighting signal in accordance with binary exponential back-off (BEB) protocol.

14. A retransmission control system as claimed in claim 10, wherein said second means includes a random number generator for generating random numbers in a predetermined range, said second means generating said weighting signal in accordance with said random number and said kind of data being transmitted.

15. A retransmission control system as claimed in claim 11, wherein said second means includes a random number generator for generating random numbers, and said weighting signal is determined in accordance with a random number generated by said random number generator and in accordance with the number of occupied blocks in the frame in which the collision occurred.

16. A retransmission control system as claimed in claim 12, wherein said second means includes a random number generator for generating random numbers, and said weighting signal is determined in accordance with a random number generated by said random number generator and in accordance with the number of occupied blocks in the frame in which the collision occurred.

17. In a multi-station communications network of the type wherein a plurality of stations communicate with one another over a communication medium and wherein data signals on said medium are grouped into frames periodically occurring on a time axis, with each frame comprising a plurality of successively occurring blocks, each station including means for transmitting signals onto said medium to occupy a previously unoccupied block, whereby multiplexed digital signals are transmitted on said medium in a time division manner, a retransmission control system for determining a retransmission time interval after which a particular station will retransmit its signals after a collision has occurred between the signals of said particular station and the signals of at least one other station, said retransmission control system comprising means for generating a first signal representing the kind of data being transmitted by said particular station, and means for determining said retransmission time interval in accordance with said first signal.

18. In a multi-station communications network of the type wherein a plurality of stations communicate with one another over a communication medium and wherein data signals on said medium are grouped into frames periodically occurring on a time axis, with each frame comprising a plurality of successively occurring blocks, each station including means for transmitting packet signals onto said medium to occupy a previously unoccupied block, whereby multiplexed digital signals are transmitted on said medium in a time division manner, a retransmission control system for determining a retransmission time interval after which a particular station will retransmit its signals after a collision has occurred between the signals of said particular station and at least one other station, said retransmission control system comprising means for generating a first signal in accordance with the number of occupied blocks in the frame in which a collision has occurred, and means for determining said retransmission time interval in accordance with said first signal.

* * * * *